United States Patent
Lawton et al.

(10) Patent No.: US 7,529,372 B2
(45) Date of Patent: May 5, 2009

(54) METHOD FOR SETTING AN ENCRYPTION KEY FOR LOGICAL NETWORK SEPARATION

(75) Inventors: William E. Lawton, Gainesville, FL (US); Frank Aiello, Ocala, FL (US); Stan Kostoff, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 722 days.

(21) Appl. No.: 10/669,097

(22) Filed: Sep. 23, 2003

(65) Prior Publication Data

US 2004/0131189 A1   Jul. 8, 2004

Related U.S. Application Data

(60) Provisional application No. 60/413,388, filed on Sep. 25, 2002.

(51) Int. Cl.
*H04K 1/00* (2006.01)
(52) U.S. Cl. ............... 380/255; 380/258; 370/203; 370/432; 709/227
(58) Field of Classification Search ........ 380/277, 380/255, 258; 709/220; 713/161, 171, 186; 370/203, 430, 432, 447
See application file for complete search history.

(56) References Cited

U.S. PATENT DOCUMENTS

| | | | | |
|---|---|---|---|---|
| 5,081,678 | A * | 1/1992 | Kaufman et al. | 713/161 |
| 6,687,825 | B1 * | 2/2004 | Challener et al. | 713/176 |
| 6,854,059 | B2 * | 2/2005 | Gardner | 713/171 |
| 6,907,044 | B1 * | 6/2005 | Yonge et al. | 370/445 |
| 6,909,723 | B1 * | 6/2005 | Yonge et al. | 370/447 |
| 6,987,770 | B1 * | 1/2006 | Yonge, III | 370/401 |
| 7,095,852 | B2 * | 8/2006 | Wack et al. | 380/44 |
| 7,222,239 | B2 * | 5/2007 | Smith | 713/185 |
| 2002/0032873 | A1 * | 3/2002 | Lordemann et al. | 713/201 |
| 2003/0079000 | A1 * | 4/2003 | Chamberlain | 709/220 |
| 2003/0103521 | A1 * | 6/2003 | Raphaeli et al. | 370/445 |
| 2003/0177370 | A1 * | 9/2003 | Smith | 713/186 |
| 2004/0208316 | A1 * | 10/2004 | Wack et al. | 380/44 |
| 2005/0071646 | A1 * | 3/2005 | Hollingshead | 713/186 |

* cited by examiner

*Primary Examiner*—Kimyen Vu
*Assistant Examiner*—April Y Shan
(74) *Attorney, Agent, or Firm*—Allen Dyer Doppelt Milbrath & Gilchrist

(57) ABSTRACT

A system and method is described for reliably transferring a node in a communications network from one Logical Network to another Logical Network. The system and method is reliable and robust with respect to potentially varying implementations of host devices in the communications network, and is compatible with other network management operations as specified in HomePlug Specifications.

5 Claims, 1 Drawing Sheet

METHOD FOR SETTING AN ENCRYPTION KEY FOR LOGICAL NETWORK SEPARATION

CROSS REFERENCE TO RELATED APPLICATIONS

This application claims the benefit of U.S. Provisional Application Ser. No. 60/413,388, filed Sep. 25, 2002, the disclosure of which is hereby incorporated by reference herein in its entirety all commonly owned.

FIELD OF THE INVENTION

The invention relates to systems and methods for grouping communications nodes into sub-networks in general, and particularly to altering the logical structure of a network by moving any given node reliably from one sub-network to another. The invention is applicable to the field of power line networking, and particularly to the specifications set out in the HomePlug 1.0.1 Specification of the HomePlug Power Alliance, incorporated here by reference.

BACKGROUND

The technique of home networking over residential power lines has received considerable attention in recent years. The HomePlug Powerline Alliance, for example, has established a high-speed networking standard, and to date several manufacturers are producing and marketing power-line communication devices (PLC devices) for the consumer market that are interoperable under the HomePlug standard.

To achieve interoperability, a part of the HomePlug Specification outlines a network protocol to which all makers of HomePlug compliant devices must adhere. The network protocol is designed to allow multiple devices to share access to the same physical medium, and to facilitate, as much as possible, communication between the devices. It will be helpful to introduce certain concepts and terminology from the HomePlug protocol before describing the details of this invention.

Terminology: The following selectively introduces some terminology in accordance with HomePlug Specification 1.0.1, as well as pending U.S. patent application Ser. No. 09/632,310, which is incorporated by reference.

Logical Networks In some cases it is desirable to logically separate multiple groups of PLC devices that all share access to the same underlying physical medium (i.e., the same residential power line network). The "logical separation" implies that PLC devices of one group can not necessarily communicate with PLC devices of a different group. Such groups of logically separated PLC devices or network nodes are referred to as "Logical Networks".

The concept of Logical Networks is important, for instance, in the case of two neighboring apartments that share the same infrastructure of electrical wiring. Suppose that the families in each apartment establish a network of PLC devices. Without the concept of Logical Networks, PLC devices in one apartment could intercept messages from PLC devices in the neighboring apartment, since they share the same physical medium.

Network Encryption Key (NEK): A Logical Network is established under the HomePlug protocol by means of a Network Encryption Key. All PLC devices in a given Logical Network may encrypt/decrypt messages using the same Network Encryption Key. This key is known only to devices within the logical network, and thus provides security from intruders.

Device Encryption Key (DEK): Each PLC device under the HomePlug Specification has its unique device encryption key. Similar to the Network Encryption Key, a device encryption key may be used to encrypt/decrypt messages such that only other PLC devices with knowledge of the same DEK can communicate with the present device.

MAC Management Entry (MME): The HomePlug Specifications provides for the use of a number of network management commands, so that a network can properly be established and managed, by the participating PLC devices. The acronym MAC stands for Medium Access Control. Each PLC device is prescribed to have a defined behavior in response to certain MAC Management Entries (MMEs). Some MMEs that are of interest in context with the present invention are:

SetNEK: When a HomePlug PLC device receives a Set-NEK MME, its defined behavior is to set its Network Encryption Key to a key found in the MME. If the NEK was successfully set, the PLC device then proceeds to transmit a ConfirmNEK MME to notify the requesting unit of the success of the procedure.

ConfirmNEK: The ConfirmNEK MME is sent in response to a SetNEK, if setting the Network Encryption Key was indeed done successfully at the node that received the SetNEK request.

StatsRequest: A request for some network statistics and parameters. The receiver of such a request is directed to return a StatsResponse MME with the said network statistics and parameters.

StatsResponse: The StatsResponse MME is sent in response to the StatsRequest MME.

Controlling Station: In the context of this filing the term controlling station refers to a particular PLC device in the network, that has access to all necessary information to issue MAC management entries as required.

MAC Address: A MAC address is a unique identifier for each PLC device that participates in a given network. Knowledge of a node's MAC address enables any other node in the same logical network to direct a message directly to the node of said address.

Universal Broadcast: A message with the destination address field set such that any listening node may receive the message. Note, that a broadcast message may be encrypted however, so that only nodes with access to the proper decryption key may decypher the message.

Unicast: In contrast to a Universal Broadcast, a Unicast is a message with the destination address field set to the MAC address of a unique node.

Remote Setting of Network Encryption Key: Provisions have been made in the HomePlug Specification particularly for the setting of the Network Encryption Key. A simple procedure to achieve such a remote setting will now be described as with reference to FIG. 1, an illustrative example.

As shown in FIG. 1, a network is given that consists of two logical networks, Logical Network 1 and Logical Network 2, a controlling station, and participant PLC devices in the network (not shown). To move Node A from Logical Network 1 to Logical Network 2, the following procedure may be applied in accordance to the HomePlug protocol. This procedure is referred to as Procedure A.

Procedure A

1. The controlling station prepares a SetNEK MME (with the NEK to be set to the NEK of Logical Network 2) as a universal broadcast message and the frame is encrypted with the Device Encryption Key of Node A and transmitted.
2. Node A receives the SetNEK MME of step 1, sets its own NEK to the one obtained in the MME of Step 1, and replies with a ConfirmNEK MME. Note that other nodes in the network will not receive the SetNEK MME, due to the fact that they do not have the proper device encryption key to decode the message.

3. Upon reception of the ConfirmNEK MME, the controlling station updates network information as required, and the procedure is finished.

Given the proper execution of all steps, Procedure A presents an efficient method to achieve the remote setting of the network encryption key for a PLC device. The problem with Procedure A is that the transmission of a ConfirmNEK is defined as a host function in the HomePlug 1.0.1 Specification (the host is the device that is connected to the network through a PLC device, for example, if a personal computer is connected to a network via a PLC device, the personal computer is considered the host device). Host devices are not subject to the HomePlug 1.0.1 specification, therefore, it is not certain that they are all correctly implemented to execute ConfirmNEK requests. Without the ability to properly execute a ConfirmNEK request, Procedure A becomes unreliable, and Logical Networks cannot be established as desired.

This is further illustrated by the following exemplary application of Procedure A. Referring to FIG. 2, consider Logical Network 1 to be a collection of PLC device in Apartment 1, and Logical Network 2 to be a collection of PLC devices in Apartment 2, which shares the residential power line network with Apartment 1. A new PLC device is to be added to Logical Network 1. According to the HomePlug Specification new devices will have a default Network Encryption Key, thus when the new PLC device is first connected to the residential power line it is the sole member of a third Logical Network, labeled Logical Network 0 in FIG. 2. To integrate the new device into the existing Logical Network structure it must obtain the Network Encryption Key for Logical Network 1. Suppose a controlling station in Logical Network 1 initiates Procedure A. Suppose Step 1 executes, but Step 2 does not. Then, other devices in Logical Network 1 may not communicate with the new device using the Network Encryption Key of Logical Network 1, and the network remains non-secure.

SUMMARY OF THE INVENTION

The present invention provides a system method for altering the Logical Network structure of a network of PLC devices that are compliant with the HomePlug Specification. In particular, the invention includes a procedure for remotely setting the Network Encryption Key of a PLC device. It is the Network Encryption Key of a device that determines its membership in a logical network.

Previous methods exist to achieve the remote setting of a Network Encryption Key, however, they are prone to error, because they rely on a particular exchange of a SetNEK and ConfirmNEK request, that cannot be guaranteed by any configuration of PLC and host devices. When the exchange of SetNEK and ConfirmNEK fails, the desired Logical Network Structure is not achieved.

The present invention removes the reliance of the procedure on the exchange of a SetNEK and ConfirmNEK request. This makes the method described by the present invention more robust and more practical for real PLC devices.

DETAILED DESCRIPTION OF EMBODIMENTS

Figure 1:
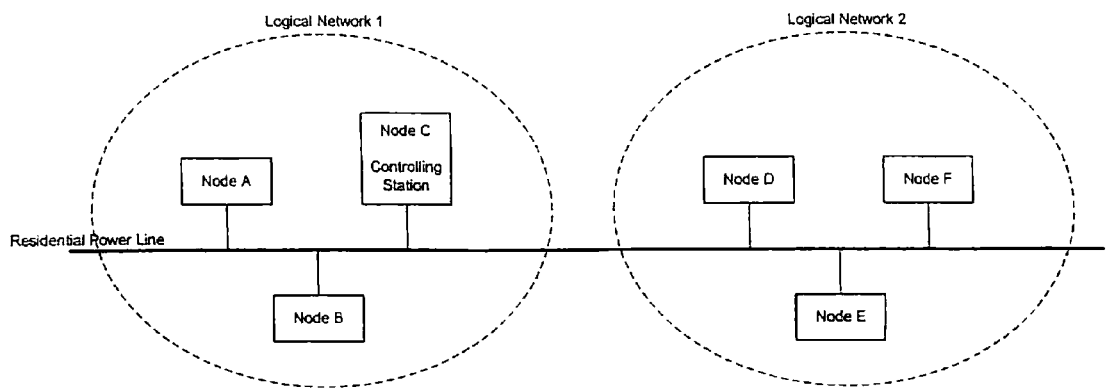
FIGS. 1 and 2 are diagrams illustrating logical network configurations applicable to the present invention.
Figure 2:
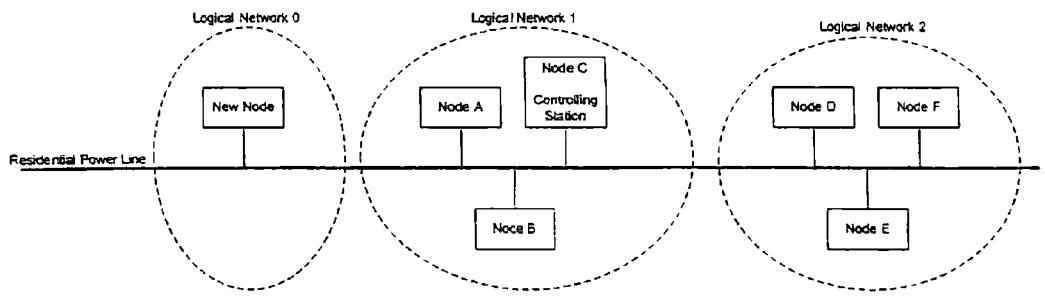

A better understanding of the present invention can be obtained when the following detailed description of the preferred embodiment is considered in conjunction with the following drawing, in which FIG. 1 is a diagram depicting an exemplary network configuration, including two Logical Networks that reside on the same residential power line. The preferred embodiment of the invention is given by a description of Procedure B. Referring to FIG. 1, Procedure B describes the necessary steps to move Node A from Logical Network 1 to Logical Network 2. It should be noted that Procedure B can be equally well applied to the integration of a new node into the existing structure of Logical Networks, as illustrated in FIG. 2.

Procedure B

1. The controlling station prepares a SetNEK MME as a universal broadcast message and the frame is encrypted with the Device Encryption Key of Node A and transmitted. The value of the NEK in the MME is set to refer to a temporary Logical Network, that is used solely in the context of the present procedure. It is required that the value of the NEK for the temporary Logical Network does not equal the recommended default NEK as defined in the HomePlug Specification. Preferably the value of the NEK is selected randomly from the set of all possible NEK values, except the recommended default NEK defined in the HomePlug Specification.

2. The controlling station prepares another MME for universal broadcast which is encrypted with the NEK for the temporary Logical Network as determined in Step 1. For example, the controlling station may transmit a StatsRequest MME.

3. The StatsRequest MME is received by Node A, which at this time is logically placed in the temporary Logical Network. Node A responds to the StatsRequest MME by preparing and transmitting a StatsResponse MME.

4. The controlling station receives and processes the StatsResponse MME. Since there is only one member in the temporary Logical Network (besides the controlling station itself), there is only one StatsResponse. From the StatsResponse MME, the controlling station extracts the MAC address of Node A.

5. The controlling station prepares a SetNEK MME as a direct message (unicast) for Node A. The message uses the MAC address of Node A retrieved in Step 4, and is encrypted with the Device Encryption Key of Node A. The value of the NEK in the MME is set to refer to Logical Network 2.

6. The controlling station prepares a StatsRequest MME encrypted with the NEK corresponding to Logical Network 2, and addressed directly (unicast) to Node A, via the known MAC address of Node A.

7. The StatsRequest MME is received by Node A, which at this time is logically placed in Logical Network 2. Node A responds to the StatsRequest MME by preparing and transmitting a StatsResponse MME.

8. The controlling station receives and processes the StatsResponse MME. It is thus confirmed that Node A is correctly placed in Logical Network 2.

Procedure B above makes exemplary use of the interchange of StatsRequest and StatsResponse MME, between the controlling station and Node A. The exact nature of the MME pair is not crucial, the main requirement is that transmission of the first MME, invokes a response MME from the recipient. The actual purpose of exchanging MME pairs is as follows. The exchange that is encompassed in Steps 2, 3, and 4 takes place to convey to the controlling station the MAC address of Node A. The exchange that is encompassed in Steps 6, 7, and 8 takes place to convey to the controlling station that Node A has successfully set its NEK to the NEK corresponding to Logical Network 2.

What is claimed is:

1. A method for adding a remote device to a logical network on a network medium, the method comprising:

transmitting a first broadcast message over the network medium, the first broadcast message having a first Set Network Encryption Key (SetNEK) request with a unique, temporary network encryption key (NEK) and being encrypted with a device encryption key (DEK) of the remote device;

transmitting a second broadcast message over the network medium, the second broadcast message requiring a first response from the remote device and being encrypted with the unique, temporary NEK;

determining a media access control (MAC) address of the remote device by receiving the first response and extracting the MAC address;

transmitting a second SetNEK request with a local NEK for the logical network to the remote device;

transmitting a unicast message directly to the remote device using the MAC address, the unicast message requiring a second response from the remote device and being encrypted with the local NEK; and confirming that the remote device has been added to the logical network based on receipt of the second response; wherein the network is a powerline network.

2. The method of claim 1, wherein the second SetNEK request is transmitted directly to the remote device using the MAC address in another unicast message.

3. The method of claim 1, wherein the remote devices are implemented according to the HomePlug Powerline Alliance standard.

4. The method of claim 1, wherein the second broadcast message is a request statistics MAC Management Entry (MME) and the first response is a statistic response MME.

5. The method of claim 1 wherein the second broadcast message is a request channel estimation MME and the first response is a channel estimation response.

* * * * *